(12) United States Patent
Sato et al.

(10) Patent No.: US 11,128,925 B1
(45) Date of Patent: Sep. 21, 2021

(54) MEDIA PRESENTATION SYSTEM USING AUDIENCE AND AUDIO FEEDBACK FOR PLAYBACK LEVEL CONTROL

(71) Applicant: NXP USA, Inc., Austin, TX (US)

(72) Inventors: Haku Sato, Austin, TX (US); Paul M. Herbst, Austin, TX (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/804,736

(22) Filed: Feb. 28, 2020

(51) Int. Cl.
| | | |
|---|---|---|
| H04N 21/485 | (2011.01) | |
| H04N 21/442 | (2011.01) | |
| G06F 3/16 | (2006.01) | |
| G06K 9/00 | (2006.01) | |
| G06N 20/00 | (2019.01) | |

(52) U.S. Cl.
CPC ......... *H04N 21/4852* (2013.01); *G06F 3/165* (2013.01); *G06K 9/00315* (2013.01); *G06N 20/00* (2019.01); *H04N 21/44218* (2013.01)

(58) Field of Classification Search
CPC . G06F 3/16; G06F 3/162; G06F 3/165; G06F 3/167; G06N 20/00; H04N 21/4825; H04N 21/44218; H04N 21/44213; G06K 9/00315; G06K 9/00221; G06K 9/00228; G06K 9/00234; G06K 9/00241; G06K 9/00248; G06K 9/00255; G06K 9/00268; G06K 9/00275; G06K 9/00281; G06K 9/00288; G06K 9/00295; G06K 9/00302; G06K 9/00308; G06K 9/00335; G06K 9/00342; G06K 9/00348; G06K 9/00355; G06K 9/00369; G06K 9/00375; G06K 9/00382; G06K 9/00389; G06K 2009/00328; G06K 2009/00322; G06K 2009/00395
See application file for complete search history.

(56) References Cited

U.S. PATENT DOCUMENTS

| | | |
|---|---|---|
| 6,522,863 B2 | 2/2003 | Kawamura |
| 9,165,144 B1 * | 10/2015 | Goldstein ............... G06F 21/60 |
| 9,304,735 B2 | 4/2016 | Bates et al. |
| 9,872,119 B2 | 1/2018 | Bush |
| 9,952,825 B2 | 4/2018 | Sheen |
| 9,967,689 B1 | 5/2018 | Kadri |
| 10,028,069 B1 | 7/2018 | Lang |
| 10,127,008 B2 | 11/2018 | Sheen et al. |

(Continued)

OTHER PUBLICATIONS

"Microsoft Kinect Sensor and Its Effect," Zhang; copyright 2012 (Year: 2012).*

*Primary Examiner* — Andrew C Flanders

(57) ABSTRACT

Automatic control of media presentation parameters is provided by using one or more of real-time audio playback measurement data from microphones and audience facial and body expression interpretation from video and infrared cameras, in conjunction with artificial intelligence for interpretation and evaluation of facial and body expression and predetermined perceptual audio models. Media presentation parameters can include, for example, speaker volume, audio equalization, feedback elimination, play/pause, and other audio content-related aspects of presentation. In some embodiments, additional environmental parameters can be modified to enhance audience experience, such as, for example, temperature, lighting, and the like, in response to audience facial and body expression.

13 Claims, 7 Drawing Sheets

(56) References Cited

U.S. PATENT DOCUMENTS

| | | | |
|---|---|---|---|
| 10,154,359 B2 | 12/2018 | Sheen | |
| 2009/0074209 A1* | 3/2009 | Thompson | H03G 9/005 381/107 |
| 2009/0133051 A1* | 5/2009 | Hildreth | H04N 21/4223 725/28 |
| 2011/0237324 A1* | 9/2011 | Clavin | G06K 9/00369 463/29 |
| 2013/0121496 A1 | 5/2013 | Boretzki | |
| 2013/0268954 A1* | 10/2013 | Hulten | H04N 21/442 725/12 |
| 2015/0070516 A1* | 3/2015 | Shoemake | H04N 21/4755 348/207.11 |
| 2016/0345060 A1* | 11/2016 | Marci | A61B 3/113 |
| 2017/0094434 A1 | 3/2017 | Bhogal et al. | |
| 2017/0134803 A1* | 5/2017 | Shaw | H04N 21/42203 |
| 2017/0251336 A1* | 8/2017 | Keller | H04W 4/023 |
| 2017/0277875 A1* | 9/2017 | Ingrassia, Jr. | G06F 21/6209 |
| 2018/0091574 A1* | 3/2018 | von Cavallar | H04N 21/4222 |
| 2018/0124459 A1* | 5/2018 | Knox | H04N 21/4223 |
| 2018/0364966 A1 | 12/2018 | Valeri et al. | |
| 2019/0090020 A1* | 3/2019 | Srivastava | G11B 27/28 |
| 2019/0164130 A1* | 5/2019 | Marci | H04N 21/25883 |
| 2019/0297380 A1* | 9/2019 | Dominguez | H04N 21/44218 |
| 2019/0394420 A1* | 12/2019 | Kim | H03G 3/04 |
| 2020/0226465 A1* | 7/2020 | Harrington | G06N 3/08 |
| 2020/0273485 A1* | 8/2020 | Jagmag | H04N 21/4668 |

* cited by examiner

US 11,128,925 B1

MEDIA PRESENTATION SYSTEM USING AUDIENCE AND AUDIO FEEDBACK FOR PLAYBACK LEVEL CONTROL

BACKGROUND

Field

This disclosure relates generally to media playback control, and more specifically, to enhancing audience experience by controlling media playback parameters using interpretation of audience reaction.

Related Art

When listening to audio content provided by movies, music, conferencing, and the like, audio parameters such as volume level, dynamic range control, balance, and equalization can often require adjustments to provide an optimal listener experience. For example, volume can be too soft or too loud. Equalizer settings can be good for one song or genre but not good for another, or good for music but not movies. Alternatively, the dynamic range can be too high within one track of music or during a movie, which makes it uncomfortable to continue to experience the audio content without adjusting volume control or equalization. Such adjustments can require the listener to move from a seated position and make adjustments at the media presentation system or reach for a remote control, thereby causing a reduction in listening experience.

Constant interaction between a listener and media presentation equipment can frustrate the listener and detract from the overall experience of listening to audio content. It is therefore desirable to have a mechanism by which media playback and environmental parameters can be adjusted automatically to enhance audience experience.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments of the present system provide automatic control of media presentation parameters by using one or more of real-time audio playback measurement data from microphones and audience facial and body expression interpretation from video and infrared cameras, in conjunction with artificial intelligence for interpretation and evaluation of facial and body expression and predetermined perceptual audio models. Media presentation parameters can include, for example, speaker volume, audio equalization, feedback elimination, play/pause, and other audio content-related aspects of presentation. In some embodiments, additional environmental parameters can be modified to enhance audience experience, such as, for example, temperature, lighting, and the like, in response to audience facial and body expression.

Figure 1:
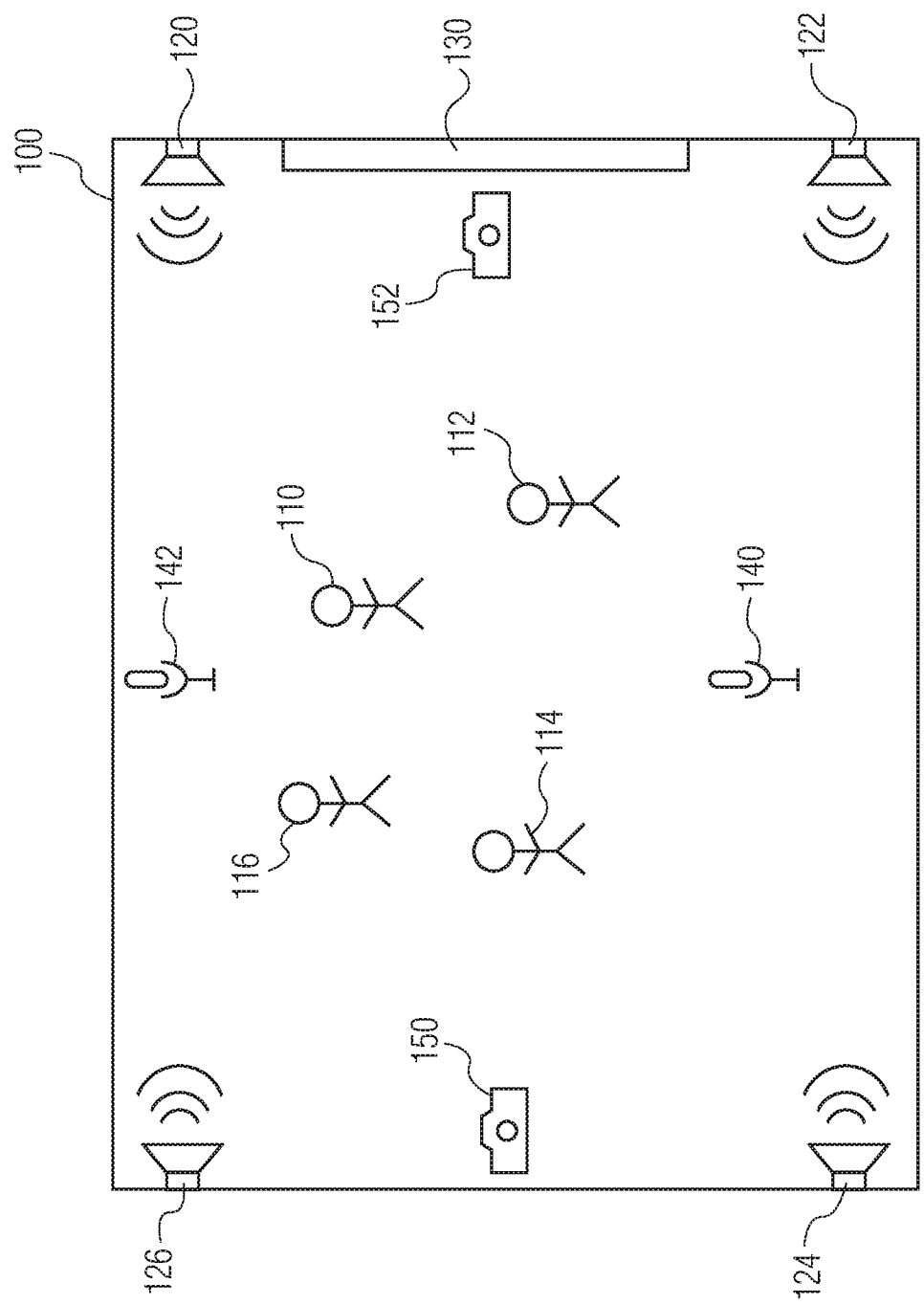
FIG. 1 is a simplified block diagram illustrating an example of an audience environment for listening to or viewing a media presentation.

FIG. 1 is a simplified block diagram illustrating an example of an audience environment 100 for listening to or viewing a media presentation. Audience members 110, 112, 114, and 116 are present in the environment in a region in which the audience members can hear an audio portion of the presentation provided by speakers 120, 122, 124, and 126. In addition, if there is a video portion of the media presentation, the audience members can view the video portion on a screen 130. Audience environment 100 can be one of a number of types of locations in which audience members can perceive a media presentation, including, for example, a media room, a presentation area, a vehicle interior. or a conference room. Each of these location types can present additional environmental features including, for example, lighting, temperature, windows, ambient sound, and the like.

Audience environment 100 also includes devices to permit monitoring of the audience environment and audience members to enable enhancing the audience experience. As illustrated, one or more audio capture devices, such as microphones 140 and 142, and one or more video capture devices, such as cameras 150 and 152, are located within the room to monitor the sound levels experienced in different areas of the room, as well as audience members. Video capture devices (e.g., cameras 150 and 152) can include both visible spectrum and invisible spectrum (e.g., infrared) image sensors to monitor audience members in all lighting scenarios and can include devices using charge-coupled devices or an active-pixel sensor to capture video images. Infrared cameras can also monitor audience member body temperature to provide additional audience engagement information. As will be discussed more fully below, these monitoring devices can provide information to a media presentation control system that can be used to adjust sound and equalization parameters. Additionally, other monitoring devices can be included in audience environment 100 to monitor other environment factors, including, for example, temperature sensors, humidity sensors, photosensors, and the like. These other environment monitoring devices can be used to provide feedback to the media presentation control system to adjust heating and air conditioning systems, lights, window blinds, and the like.

Embodiments of the present media presentation system utilize the monitoring devices (e.g., microphones 140 and 142 and cameras 150 and 152) to determine whether audio levels in audience environment 100 should be adjusted to enhance the experience of audience members 110, 112, 114, and 116. Cameras 150 and 152 can record expression of the audience members' faces, as well as eye movements and postures to aid in determining a level of an audience member's engagement with the material being presented in the audience environment. Image signal processing in conjunction with artificial intelligence processing can be used to identify facial expressions and eye movement and link certain of those facial expressions with the audience member's perception of the audio portion of the presentation or engagement with the presentation. A score can be derived from the facial expressions to determine whether and how to adjust the audio environment.

For example, a frown detected on an audience member's face can contribute to a negative score directed toward an "unpleasant" association, as opposed to a normal facial expression or a smile which could contribute to being either "neutral" or "pleasant," respectively. Pleasantness or unpleasantness are subjective and may be difficult for a typical audience member to adjust parameters properly to get a nominal listening volume or equalization level. But embodiments of the media presentation system can automatically adjust the volume or equalization levels continuously and in response to the audience facial expressions and find an optimal set of levels for the presentation material.

Microphones 140 and 142 can pick up the sound levels in the room at the locations of the microphones. The received sound can be compared against audio perception models defining typical perceived loudness. Such levels can be defined according to a perception curve, such as the Fletcher-Munson curve. An audio analyzer can compare the microphone-received audio levels against the curve values, and in context of the facial scores can aid in determining how the equalizer levels and volume levels should be adjusted for the individual listener.

Figure 2:
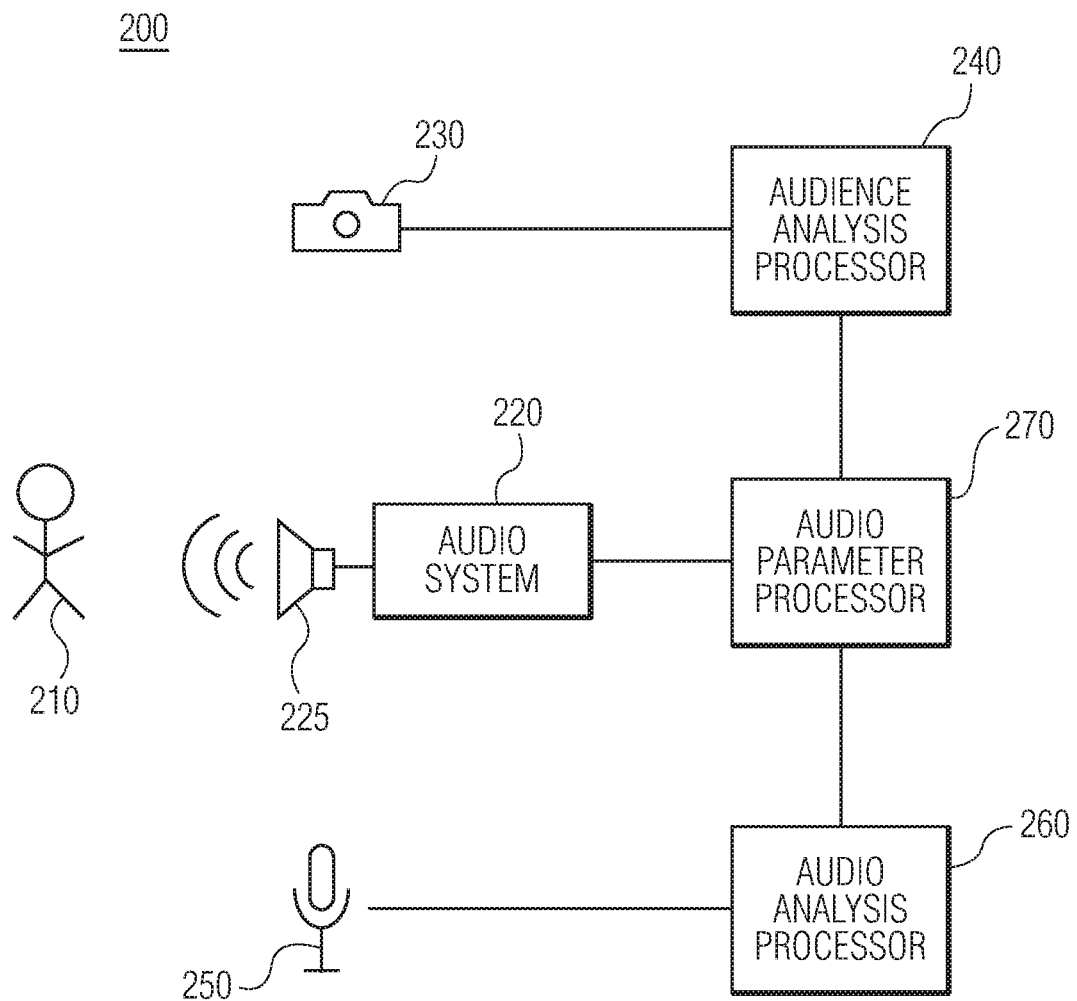
FIG. 2 is a simplified block diagram illustrating an example embodiment of a media presentation system.

FIG. 2 is a simplified block diagram illustrating an example embodiment of a media presentation system 200. The illustrated media presentation system 200 provides at least audio presentation content perceived by an audience member 210. To deliver the audio presentation content, media presentation system 200 incorporates an audio system 220 that is coupled to a speaker 225. Audio system 220 can include, for example, an amplifier coupled to volume controls and equalizer controls that can be adjusted automatically in response to information provided by audio parameter processor 270, as will be discussed in greater detail below.

Media presentation system 200 is further configured to monitor audience member 210 using one or more video capture devices, or cameras 230, coupled to an audience analysis processor 240. Cameras 230 can be installed throughout a region in which audience members are expected in order to capture facial reactions, eye movement, and posture of audience member 210 to the perceived audio content. As will be discussed more fully below, audience analysis processor 240 provides image signal processing of the images captured by cameras 230 in order to, for example, determine the locations of the faces of audience members 210. Audience analysis processor 240 further includes processing to determine in a facial expression of each audience member and utilizes the facial expression information to generate a score associated with each audience member's perception of the audio presentation content. The perception score information is then provided by audience analysis processor 240 to audio parameter processor 270 to aid in adjustment of volume and equalization. In some embodiments, cameras 230 can capture not only facial expressions from audience members 210 but also eye and body movement, which is then analyzed by audience analysis processor 240 to enhance scoring information provided to audio parameter processor 270. As discussed above, in some embodiments, cameras 230 can capture not only visible spectrum information regarding audience members but also invisible spectrum information (e.g., body temperature using infrared, or low light images) to enhance images provided to the audience analysis processor.

Media presentation system 200 also monitors sound levels in the audience environment region using one or more microphones 250 coupled to audio analysis processor 260. Microphones 250 can be installed throughout a region in which audience members are expected in order to capture sounds not only being provided by speaker 225 but also ambient noise and other generated sounds within the audience environment region. Audio analysis processor 260 can analyze the captured audio information to determine whether audio levels within the audience environment region match expected loudness perception levels for the audio content being provided. Audio analysis processor 260 can use that information along with information associated with ambient noise to determine whether equalizer and volume levels should be adjusted, and then provides that information to audio parameter processor 270 for further processing.

Audio parameter processor 270 is coupled to audio system 220 in order to automatically adjust volume and equalizer levels in response to the information provided by audience analysis processor 240 and audio analysis processor 260. Using model thresholds for volume and equalization, audio parameter processor 270 can adjust volume and equalizer levels in light of actual audio reception as measured by audio analysis processor 260 and guided by audience reaction provided by the scores from audience analysis processor 240, as will be discussed more fully below.

Figure 3:
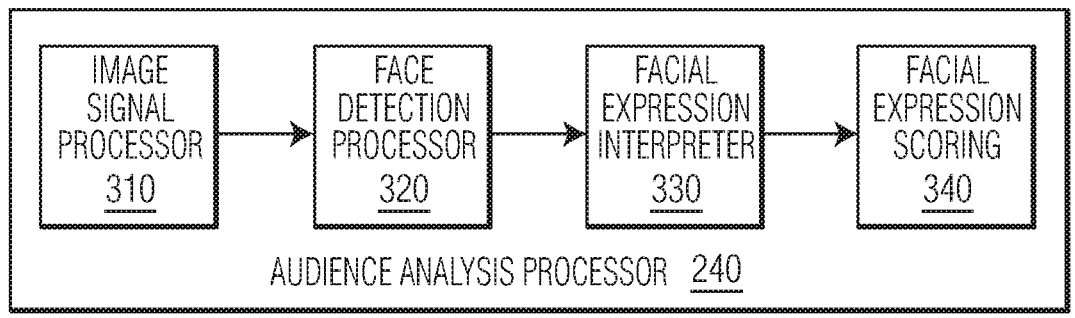
FIG. 3 is a simplified block diagram illustrating an example of an audience analysis processor, in accord with embodiments of the media presentation system.

FIG. 3 is a simplified block diagram illustrating an example of an audience analysis processor 240, in accord with embodiments of the media presentation system. As discussed above, audience analysis processor 240 receives image signals from cameras 230 installed in the audience environment region. The image signals are provided to an image signal processor 310 for image enhancement (e.g., high quality images) and conversion of pixel output from the camera into image data used by other processing modules. The enhanced images are then provided by the image signal processor to a face detection processor 320. Face detection processor 320 determines which portion of an image is associated with a face of an audience member (e.g., audience member 210) and can then track the features of the face to aid in determining changes in facial expression by facial expression interpreter 330. Face detection processor 320 detects faces and captures facial motion using one or more of a variety of algorithms known in the art, such as, for example, eigen-face techniques, active appearance models, principal components analysis, deformable surface models, and other such techniques.

The information generated by face detection processor 320 is provided to a facial expression interpreter 330. Facial expression interpreter 330 uses the captured facial motion information to determine whether an audience member is reacting to the audio presentation in a manner that suggests modifying the audio presentation, such as by volume or equalizer settings. Facial expression interpreter 330 performs this task by providing the processed image to an artificial intelligence processor coupled with deep learning for recognizing and identifying facial expressions. Through deep learning, the artificial intelligence portion of facial expression interpreter 330 can be provided with a range of expressions that can be coupled with an audience members reaction to the audio media content being perceived by the user. For example, a "neutral" facial expression can be indicative of satisfaction by the audience member with the currently set volume and equalizer levels, while a "pained" facial expression can be indicative of the volume level being too loud. Other facial expressions can be associated with sound levels being too low or being out of balance or certain frequency ranges being too loud or soft compared to other frequency ranges. Facial expression interpreter 330 determines whether an audience member is providing such an expression and identifying that expression.

In some circumstances, facial expression interpreter 330 filters out certain facial expressions as not necessarily being related to audio volume levels. For example, an audience member can be experiencing media content that has both visual and audio components, such as movies, and facial expressions identified by the facial expression interpreter may be more appropriately associated with a reaction to the visual content rather than audio perception. The artificial intelligence portion of facial expression interpreter 330 can be informed of the nature of the content being provided so as to recognize whether the facial expression of an audience member is associated with, for example, sadness, laughter, or happiness and exclude those reactions from being taken into consideration for modification of audio quality.

The identified facial expressions can then be provided to a facial expression scoring module 340 that can evaluate the identified expressions to generate a positive, neutral, or negative score that can then be utilized by audio parameter processor 270, in conjunction with inputs from audio analysis processor 260, to adjust sound levels provided by audio system 220. Negative scores can be indicative of a need to decrease volume, either overall or in a particular frequency range. Positive scores can be indicative of a need to increase volume. While a neutral score may be indicative a general satisfaction with the sound levels. Scores can be predetermined for each of a variety of expected facial expressions interpreted by the facial expression interpreter. Or alternatively, scores can vary within a range for a particular facial expression depending upon the intensity of the expression or a combination of facial expressions. In another example, the artificial intelligence portion of facial expression interpreter 330 can assess the facial expressions of multiple audience members to measure the engagement of the listeners to the contents being presented. If audience members are disengaged, that information can be provided to facial expression scoring module 340, which can then generate a negative score suggesting lowering the volume or pausing play of the media material.

Audience analysis processor 240 can incorporate the various processors and modules discussed above in one or more applications processors embodied in one or more chips in media presentation system 200. Such applications processor can take the form of a local edge processor, allowing for performance of the complex operations discussed above near the devices generating the data to be analyzed, thereby reducing an amount of data transferred over a computer network. Such an application processor can incorporate not only general-purpose processing cores but can also incorporate one or more specialized machine learning accelerators and ISP accelerators that can be configured perform the tasks discussed above with greater speed than a general-purpose core.

Figure 4:
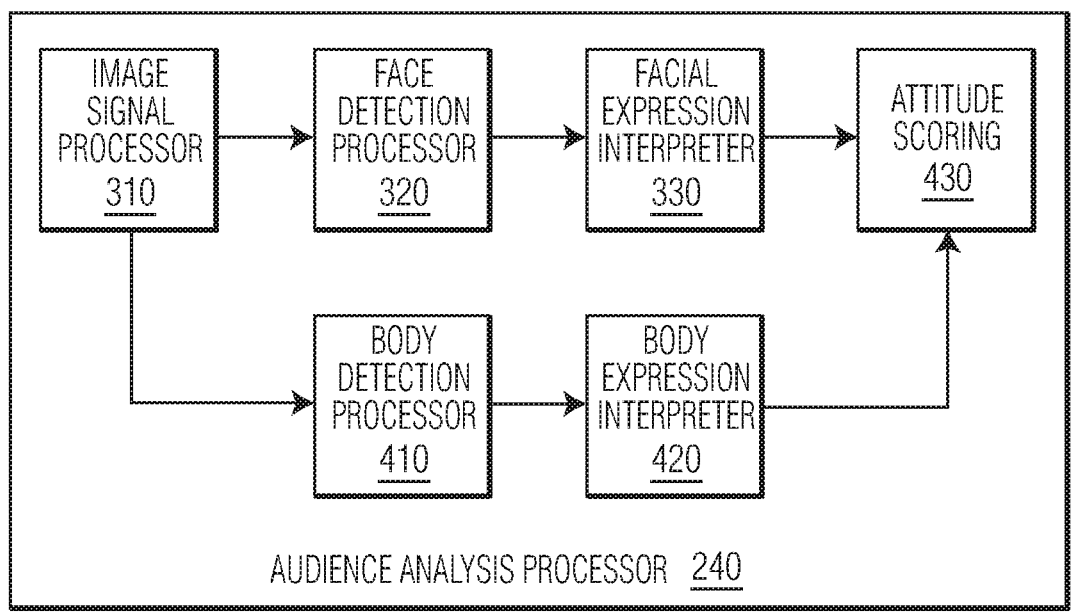
FIG. 4 is a simplified block diagram illustrating an alternative example of an audience analysis processor, in accord with embodiments of the present system.

FIG. 4 is a simplified block diagram illustrating an alternative example of an audience analysis processor 240, in accord with embodiments of the present system. The audience analysis processor illustrated in FIG. 4 includes an image signal processor 310, face detection processor 320, and facial expression interpreter 330, as discussed above with regard to FIG. 3. In addition, the audience analysis processor 240 of FIG. 4 includes additional capability to analyze other expressive aspects of audience members including, for example body language other than that expressed in the face. A body detection processor 410 can determine which portion of an image generated by image signal processor 310 is associated with a body of an audience member and can then track the movement of the audience member's body to provide data related to body expression. The information generated by body detection processor 410 can then be provided to a body expression interpreter 420. As with facial expression interpreter 330, body expression interpreter 420 can use the body motion information to determine additional information related to an audience members reaction to the audio presentation, which can aid in determining whether to modify the audio presentation. Artificial intelligence coupled with deep learning data sets can be used to inform decision-making related to body language, by associating certain movements with an audience members desire for louder or softer volumes, disengagement with the presentation material, and the like. As an example, an audience member who is leaning forward or tilting their head forward may be indicative of volume being too low and a need to raise volume. As another example, an audience member turning their head to the left or to the right may be indicative of audio balance levels needing to be adjusted for that particular audience member's hearing.

The body expression information generated by body expression interpreter 420 can be provided to attitude scoring module 430, along with information related to facial expressions as provided by facial expression interpreter 330. Attitude scoring module 430 can evaluate the facial expression information in conjunction with the body expression information to generate a positive, neutral, or negative score that can then be utilized by audio parameter processor 270, in conjunction with inputs from audio analysis processor 260, to adjust sound levels provided by audio system 220. Scoring can be similar to that generated by facial expression scoring module 340 discussed above, but with the added context provided by the body expression information of body expression interpreter 420.

Figure 5:
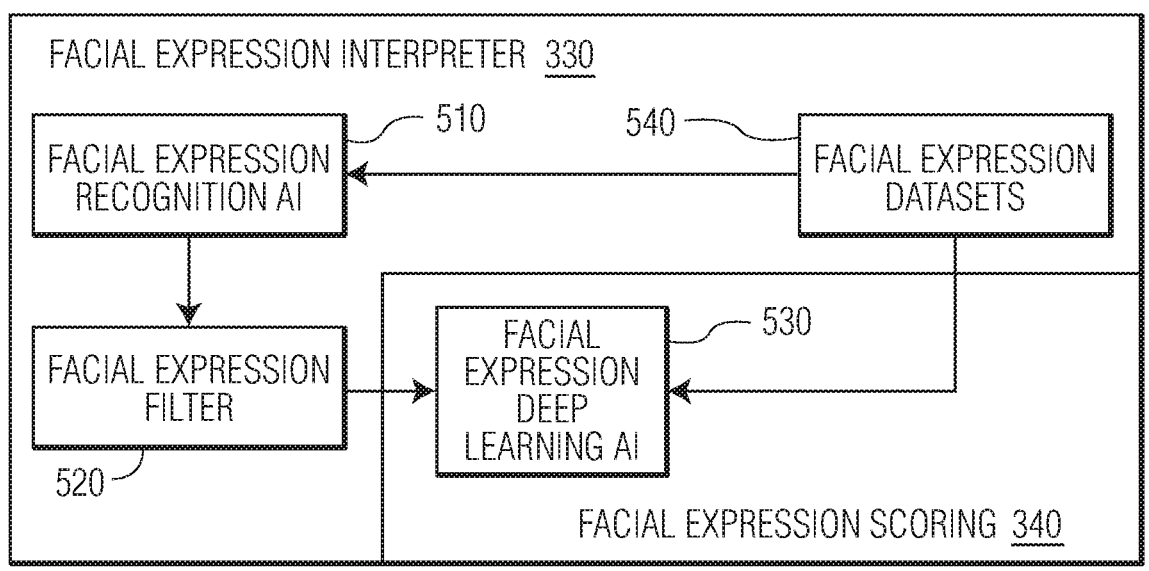
FIG. 5 is a simplified block diagram illustrating an example of a facial expression interpreter, in accord with an embodiment of the media presentation system.

FIG. 5 is a simplified block diagram illustrating an example of a facial expression interpreter 330, in accord with an embodiment of the media presentation system. As discussed above, facial expression interpreter can use captured facial motion information to determine whether an audience member is reacting to an audio presentation and can filter out expressions not related to reception the audio presentation. Facial expression interpreter 330 incorporates a facial expression recognition artificial intelligence module 510 that can determine which aspects of the image provided by image signal processor 310 and face detection processor 320 are related to facial expression. Facial expression recognition AI 510 can analyze the received images and classify the nature of the expressions in those images. Such classification can be provided by training the AI using a facial expression data set 540 acquired from interaction with a multitude of test subjects experiencing known auditory scenarios, for example. Once the facial expressions exhibited by audience member are recognized, those facial expressions can be passed to a facial expression filter 520. Facial expression filter 520 analyzes the identified expressions to determine whether the expressions are related to auditory perception, and if not, then the expressions can be discarded from consideration in making auditory level adjustments. The facial expression filter can also be informed by the nature of the content being experienced by an audience member to aid in a determination of whether an audience member expression may be related to the content rather than the audio experience. For example, a movie recording can include an identification of whether a particular scene is "sad" or "humorous" and then facial expression filter 520 can discard audience member expressions that fall within those categories.

Once filtered, the remaining facial expressions can be provided to facial expression scoring module 340. Facial expression scoring module 340 can incorporate a facial expression deep learning artificial intelligence engine 530 that evaluates the facial expression and associates a score with the evaluated facial expression. Evaluation of the facial expression can also utilize the facial expression data set 542 inform the intensity of the expression and is conjunction with other facial expressions exhibited by the audience member.

Figure 6:
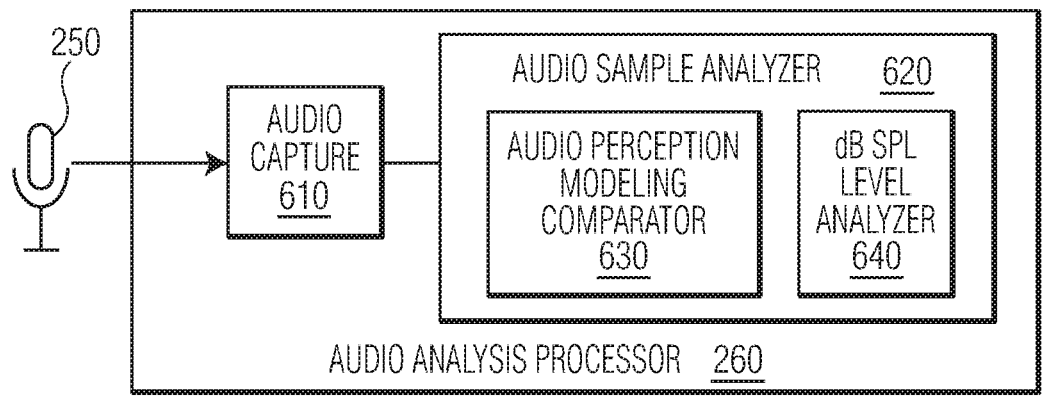
FIG. 6 is a simplified block diagram illustrating an example of an audio analysis processor incorporated in embodiments of the media presentation system.

FIG. 6 is a simplified block diagram illustrating an example of an audio analysis processor 260 incorporated in embodiments of the media presentation system. Audio analysis processor 260 analyzes captured audio information from audio capture devices in the media presentation environment to determine whether captured audio is matches expected loudness perception levels for the audio content. Microphone 250 provides input to audio capture module 610. The microphone and audio capture module gather information associated with the audio level of the media presentation environment from a perspective of an audience member (e.g., audience member 210). The captured audio information is provided as audio samples to an audio sample analyzer 620. Audio sample analyzer 620 can process the captured audio through fast Fourier transform (FFT) to permit analysis of the audio within the spectral band. Audio perception modeling comparator 630 analyzes the captured audio to select an appropriate equal-loudness contour model, for example a Fletcher-Munson curve, to compare the captured audio against. A decibel spectral level analyzer 640 compares the spectral information associated with the captured audio against the selected equal-loudness contour in order to determine whether the amplitude associated with certain frequencies provided to the media presentation environment are either too high or too low according to the model represented by the contour. Amplitude information associated with those frequencies that are in disagreement with the equal-loudness contour model can then be used in conjunction with the facial expression analysis to determine how to modify volume and equalizer settings to satisfy the audience member.

Figure 7:
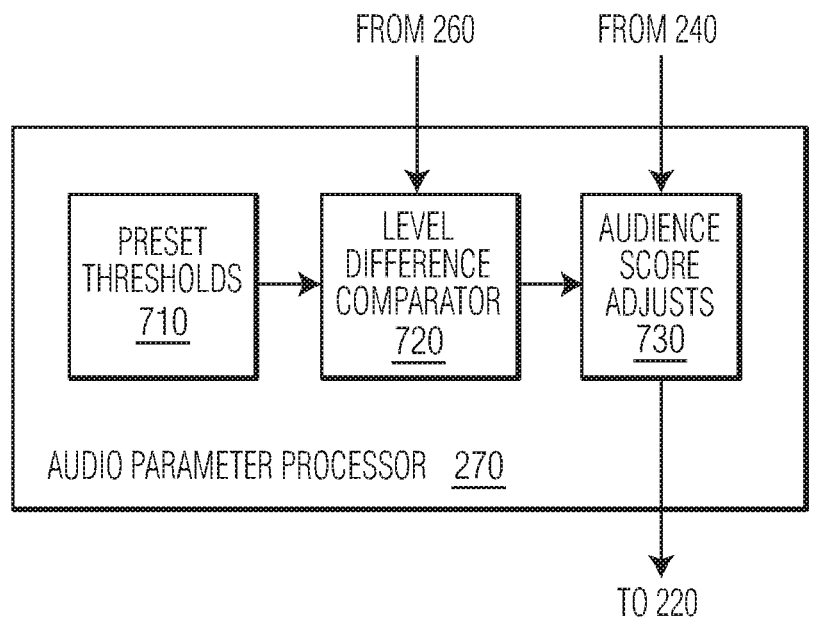
FIG. 7 is a simplified block diagram illustrating an example of audio parameter processor, in accord with an example embodiment of the present invention.

FIG. 7 is a simplified block diagram illustrating an example of audio parameter processor 270, in accord with an example embodiment of the present invention. Audio parameter processor 270 receives inputs from the audience analysis processor 240 and the audio analysis processor 260, and then determines whether volume or equalizer levels should be adjusted in response to those inputs. Audio parameter processor 270 can then determine the appropriate levels and instruct audio system 220 to adjust those levels.

Audio parameter processor 270 can include a set of stored preset thresholds for various audio parameters associated with types of media content provided by media presentation system 200. Level difference comparator 720 compares the preset thresholds with the differences from the equal-loudness perception model as provided by audio analysis processor 260. The level difference comparator thus determines whether frequencies identified by the audio analysis processor for modification are currently within the preset volume amplitude thresholds for those frequencies. For example, if an identified frequency volume peak is beyond a threshold value, then the level difference comparator can instruct that frequency level volume be dropped to the preset threshold. On the other hand, if an identified frequency volume peak is below a threshold value, then the level difference comparator can instruct that frequency volume level to be raised to a value within the threshold. Information from level difference comparator 720 can be provided to an audience score adjustment module 730. Audience score adjustment module 730 also receives the scores provided by audience analysis processor 240, and in light of those scores can determine how much to raise or lower the volume or equalizer levels provided by level comparator 720. Once the levels for adjustment have been determined, they are provided to audio system 224 implementation within the media presentation environment.

Figure 8:
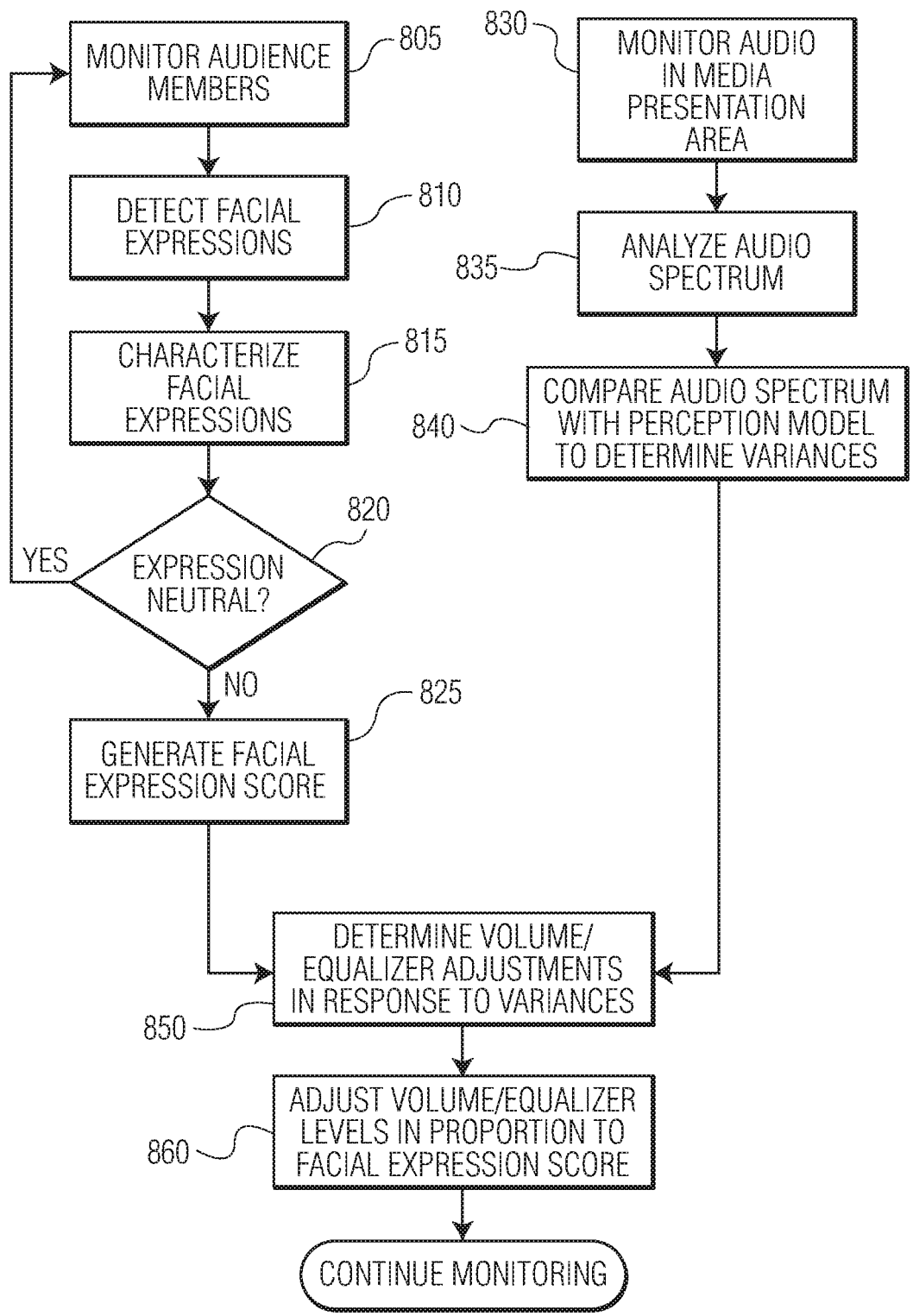
FIG. 8 is a simplified flow diagram illustrating an example flow executed by embodiments of the present media presentation system.

FIG. 8 is a simplified flow diagram illustrating an example flow executed by embodiments of the present media presentation system (e.g., media presentation system 200). As discussed above, the media presentation system is configured to monitor both audience member physical reactions to the audio portion of a media presentation as well as monitoring the sound levels within the media presentation area. The example flow illustrated in FIG. 8 provides two concurrent monitoring activities occurring: audience monitoring and analysis, which can be performed by audience analysis processor 240, and audio monitoring and analysis, which can be performed by audio analysis processor 260.

As an initial step in the audience monitoring and analysis portion of the monitoring activities, the audience members are monitored (805) using one or more cameras in the media presentation area (e.g., cameras 150 and 152). Images captured during audience monitoring are used to detect facial expressions of the monitored audience members (810). As discussed above, facial expression detection is performed using image signal processing (e.g., 310), facial detection processing algorithms and processing (e.g., 320), and facial expression interpretation (e.g., 330). Facial expression interpretation extends to characterizing the facial expressions detected (815), where the media presentation system determines the nature of the facial expression on audience members (e.g., pleasant, neutral, annoyed, unpleasant, engaged, disengaged, difficulty hearing, and not listening). As discussed above, facial expression interpretation can be performed utilizing an artificial intelligence processor that can recognize and identify facial expressions using a deep learning data set that can associate facial expressions with audio environment. If the nature of the monitored facial expressions of the audience members is neutral (820), then the media presentation system can continue to monitor the audience members, as generally neutral expressions or indicative of a satisfaction with the audio presentation levels. If the expressions are generally not neutral, then a facial expression score can be generated (825) by a facial expression scoring module (e.g., 340) of the audience analysis processor. Facial expression scoring is utilized to provide a relative numerical value associated with an audience members desire for better quality in their media presentation experience by either raising or lowering volume or equalizer settings or reflecting other desired changes in the audio portion of the media presentation.

The audio analysis and monitoring portion of the illustrated flow begins with monitoring the audio in the media presentation area (830). Such monitoring occurs through the use of, for example, microphones 140 and 142 to capture audio samples from regions of the media presentation area. An audio sample analyzer can analyze the audio spectrum of the captured audio samples (835) using, for example, Fast Fourier Transform. The audio spectrum is then compared with a perception model, such as an equal-loudness contour (e.g., Fletcher-Munson curve), to determine variances from the perception model in the media presentation area (840).

The audio spectrum variances from the perception model can then be used to determine those volume or equalizer adjustments that are desirable to compensate for those variances (850). For example, at a high overall listening volume, low and high frequencies are perceived to sound more prominent, while midrange frequencies are perceived to sound comparatively softer. This may be an indication that the midrange frequencies need to be increased to provide a more balanced perception for audience members. By comparing the captured audio spectrum to the perception model curves, a more ideal balance of frequencies for a particular overall volume can be achieved. Such adjustments are performed in light of the facial expression scores (860). For example, if the facial expression scores generally are neutral, then adjustments to the equalizer may not be made since the facial expressions of the audience members means they are generally satisfied with the present settings. On the other hand, if audience members reactions are negative, it can mean that the system should increase volumes. An imbalance between the captured audio levels and the perception model gives a guide to how the current audio experience should be adjusted to satisfy the monitored audience members. In an alternative example, if audience member reactions are associated with a desire for reducing volume, then the perception model gives a guide on how to adjust the current audio experience by focusing first on any portions of the spectrum out of balance, and then reducing overall system loudness.

As discussed above, in some embodiments of the media presentation system, not only facial expression, but also body expression can be taken into consideration to build context for audience member reaction. In those embodiments, the information captured during audience member monitoring (805) can be provided to a body expression detection processor (e.g., 410) for detecting movement of the body that can be associated with a desire for modifying the audio experience. Similar to the characterization of facial expressions, the body expressions can be characterized and associated with a desire on the part of an audience member for a change in the audio portion of the media presentation (e.g., through the use of a body expression interpreter AI 420).

Embodiments of the media presentation system can be configured to not only adjust audio parameters in response to audience member reactions, as measured by their facial expressions and body expressions. Some embodiments of the media presentation system can control other aspects of the environment in the media presentation area. For example, temperature can be adjusted up or down in light of audience member comfort level, lighting can be adjusted, window shades can be opened or closed, brightness of video presentation devices can be adjusted, and the like. For the alternative environmental controls, deep learning data sets associated with the specific controls are provided to the artificial intelligence processors associated with facial expressions and body expressions, thus enabling the artificial intelligence processors to make characterizations and scoring associated with the various environment controls.

Figure 9:
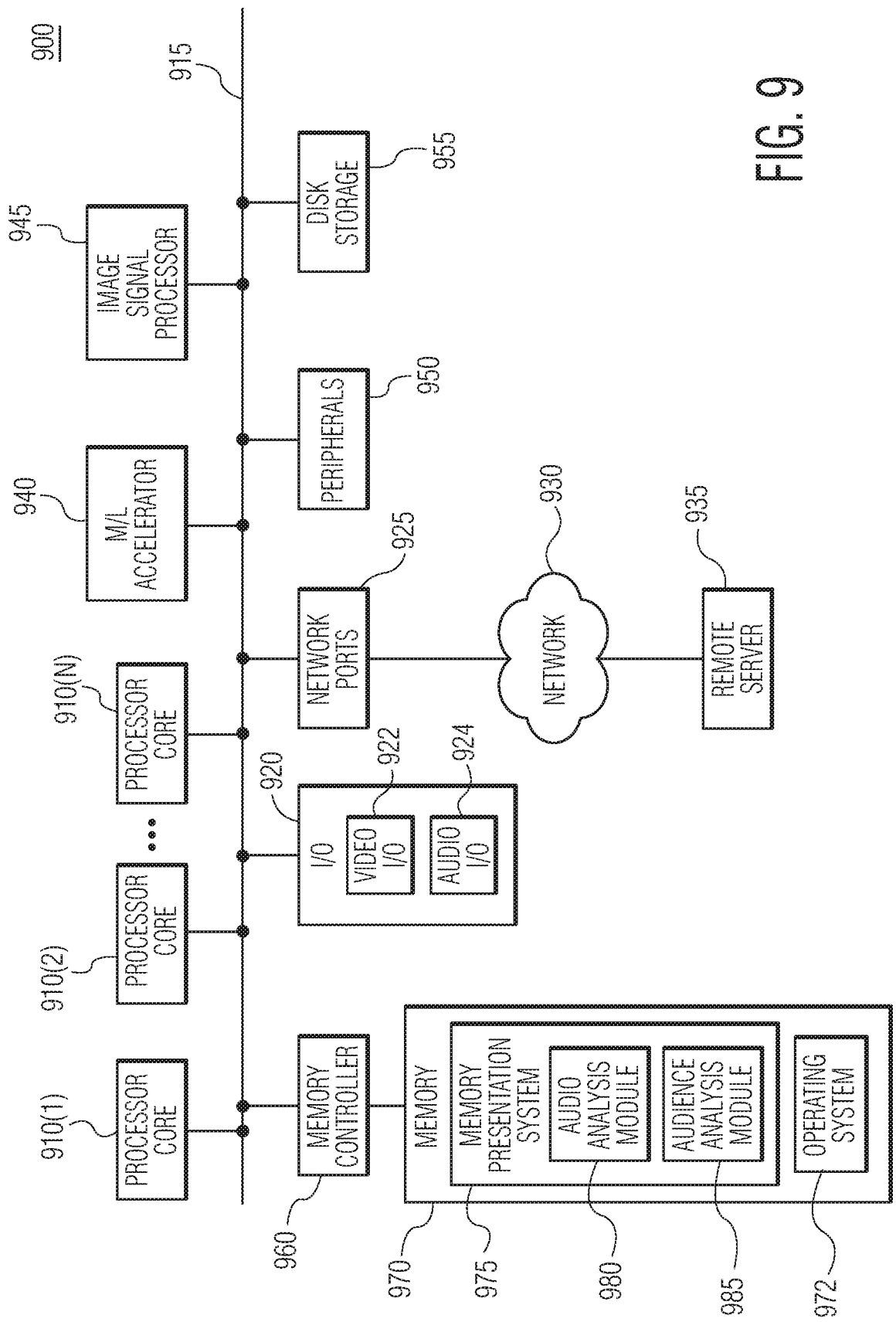
FIG. 9 is a simplified block diagram illustrating an example of a multi-core applications processor 900 incorporating hardware configured to implement the system and method of the present media presentation system.

FIG. 9 is a simplified block diagram illustrating an example of a multi-core applications processor 900 incorporating hardware that can be used to implement the system and method of the present media presentation system. A system interconnect 915 communicatively couples all illustrated components of the multi-core applications processor. A set of processor cores 910(1)-(N) are coupled to system interconnect 915. Each processor core includes at least one CPU and local cache memory. Further coupled to the system interconnect are input/output devices 920, including video input/output devices 922 and audio input/output devices 944, along with other necessary input/output devices for an application, such as display, keyboard, mouse, and other associated controllers. The applications processor also includes a network port 925 operable to connect to a network 930, which is likewise accessible to one or more remote servers 935. The remote servers can provide deep learning data sets for the portions of the present system that utilize artificial intelligence/machine learning operations, as discussed above.

A machine learning accelerator 940 is also communicatively coupled to processor cores 910, along with an image signal processor 945. Machine learning accelerator 940 is circuitry dedicated to performing machine learning tasks associated with image recognition, as discussed above. Through the system interconnect, any of the processor cores can provide instructions to the machine learning accelerator. Similarly, the image signal processor can communicate with all of the processor cores and the I/O devices.

In addition to the machine learning accelerator and image signal processor, other peripherals or peripheral controllers 950 and disk storage or disk controllers 955 are communicatively coupled to system interconnect 915. Peripherals 950 can include, for example, circuitry to perform power management, flash management, interconnect management, USB, and other PHY type tasks.

Applications processor 900 further includes a system memory 970, which is interconnected to the foregoing by system interconnect 915 via a memory controller 960. System memory 970 further comprises an operating system 972 and in various embodiments also comprises media presentation system 975. Media presentation system 975 performs the tasks described above with regard to monitoring and analyzing a media presentation environment for audio and audience feedback to modify an audio portion of a media presentation. The media presentation system further includes an audio analysis module 980 and an audience analysis module 985 to perform said monitoring and analysis. Media presentation system 975 includes the instructions necessary to configure applications processor, and all implicated portions thereof, to perform the processes discussed herein.

By now it should be appreciated that there has been provided a media presentation system that includes an amplifier coupled to one or more speakers located in a media presentation area, and audio analysis processor coupled to one or more audio capture devices located in the media presentation area, and audience analysis processor coupled to one or more video capture devices in the media presentation area, and an audio parameter processor coupled to the amplifier, the audio analysis processor, and the audience analysis processor. The amplifier is configured to generate an audio portion of a media presentation in the media presentation area. The audio analysis processor is configured to analyze the generated audio portion. The audience analysis processor is configured to capture a facial expression of an audience member and analyze the facial expression for reaction to the generated audio portion. The audio parameter processor is configured to instruct the amplifier to adjust one or more parameters associated with the audio portion of the media presentation in response to information associated with the audio analysis received from the audio analysis processor and the audience analysis received from the audience analysis processor.

In one aspect of the above embodiment, the audience analysis processor further includes an image signal processor coupled to the one or more video capture devices, a face detection processor coupled to the image signal processor, a facial expression interpreter coupled to the face detection processor, and a facial expression scoring module coupled to the facial expression interpreter. The image signal processor is configured to convert image data captured by the one or more video capture devices to formatted image data. The face detection processor is configured to determine a portion of the formatted image data that is associated with a face of the audience member. The facial expression interpreter is configured to characterize a facial expression of the face of the audience member. The facial expression scoring module is configured to generate a score associated with the characterized facial expression where the score reflects the reaction of the audience member to the generated audio portion.

In a further aspect, the facial expression interpreter includes one or more machine learning processors configured to determine a facial expression from the portion of the formatted image data associated with the base of the audience member and characterize the facial expression by associating the facial expression with a known reaction to perceiving and audio presentation. In yet a further aspect, the facial expression interpreter further includes a facial expression filter coupled to the face detection processor and the facial expression interpreter. The facial expression filter is configured to exclude the facial expression from the facial expression interpreter if the facial expression is not associated with the generated audio portion. In another further aspect, the facial expression interpreter further includes one or more data sets including characterized facial expressions.

In another aspect, the facial expression interpreter includes circuitry configured to determine a facial expression from the portion of the formatted image data associated with the base of the audience member. In still another aspect, the audience analysis processor further includes a body detection processor coupled to the image signal processor, and a body expression interpreter coupled to the body detection processor. The body detection processor is configured to determine a portion of the formatted image that is associated with a body of the audience member. The body expression interpreter is configured to characterize a body expression of the body of the audience member where the facial expression scoring module is further configured to generate the score in association with the characterized body expression.

In another aspect, the one or more video capture devices include an electronic imaging device including one of a charge-coupled device or an active-pixel sensor. In a further aspect, the one or more video capture devices includes a digital camera. In another aspect, the audio analysis processor includes audio capture circuitry coupled to the one or more audio capture devices, and audio sample analyzer circuitry coupled to the audio capture circuitry. The audio capture circuitry is configured to generate audio sample data of the generated audio portion from the one or more audio capture devices. The audio sample analyzer circuitry is configured to compare the audio sample data with an equal-loudness contour model. In a further aspect, the audio sample analyzer circuitry includes fast Fourier transform circuitry to convert the audio sample to a spectral band. In another further aspect, the audio sample analyzer circuitry includes a decibel spectral level analyzer configured to compare the audio sample against the equal-loudness contour model to determine whether there are amplitudes of frequency ranges associated with the audio sample that do not conform to corresponding values of the equal-loudness contour model. In yet a further aspect, the equal-loudness contour is selected from a set of equal-loudness contours in response to a present loudness level of the generated audio portion. In another further aspect, the equal-loudness contour includes a Fletcher-Munson curve.

Another embodiment provides a method for controlling audio levels in a media presentation environment. The method includes monitoring audio levels in one or more locations of the media presentation environment, monitoring and audience member in the media presentation environment for reaction to the audio levels, and adjusting one or more of the audio levels in response to set monitoring of the audio levels and set monitoring of the audience member. In one aspect of the above embodiment, monitoring the audience member for reaction to the audio levels includes detecting one or more facial expressions of the audience member, characterizing the detected one or more facial expressions of the audience member, and generating a facial expression score of the characterized facial expressions where the facial expression score corresponds to the reaction of the audience member to the audio levels. In a further aspect, the method further includes filtering the detected facial expressions to remove a facial expression unrelated to audio levels from said characterizing. In another further aspect, said detecting the one or more facial expressions and said characterizing the detected one or more facial expressions are performed using a machine learning algorithm to perform said detecting and characterizing.

In another embodiment, an application processor is provided that includes: one or more general-purpose processors; audio sampling circuitry coupled to the one or more processors and one or more audio capture devices; one or more image signal processors coupled to the one or more processors and one or more video capture devices; one or more machine learning accelerators coupled to the one or more general-purpose processors; and a memory coupled to the one or more general-purpose processors and the one or more machine learning accelerators. The audio sampling circuitry is configured to generate audio sample data from the one or more audio capture devices where the one or more audio capture devices are located in a media presentation area and receive a generated audio portion of a media presentation. The one or more image signal processors are configured to convert image data captured by the one or more video capture devices to formatted image data where the one or more video capture devices are located in the media presentation area and are configured to capture images of an audience member in the media presentation area. The memory stores instructions executable by one or more of the one or more general-purpose processors and the one or more machine learning accelerators. The instructions are configured to determine by the general-purpose processor a portion of the formatted image data that is associated with a face of the audience member, characterized by the machine learning accelerator a facial expression of the face of the audience member, and generate by the general-purpose processor a score associated with the characterized facial expression where the score reflects a reaction of the audience member to the generated audio portion.

In a further aspect, the memory stores further instructions configured to compare the audio sample data with an equal-loudness contour model to determine whether there are amplitudes of frequency ranges associated with the audio sample data that do not conform to corresponding values of the equal-loudness contour model, and adjust one or more of volume and equalizer values in response to the comparison of the audio sample data and the score associated with the characterized facial expression where the score determines an adjustment portion of the difference between the audio sample data and the equal-loudness contour model.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 9 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also, for example, in one embodiment, the illustrated elements of system 900 are circuitry located on a single integrated circuit or within a same device. Alternatively, system 900 may include any number of separate integrated circuits or separate devices interconnected with each other. For example, memory 960 may be located on a same integrated circuit as processor cores 910 or on a separate integrated circuit or located within another peripheral or slave discretely separate from other elements of system 900. Peripherals 950 and I/O circuitry 920 may also be located on separate integrated circuits or devices. Also, for example, portions of system 900 may be soft or code representations of physical circuitry or of logical representations convertible into physical circuitry. As such, portions of system 900 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 900, for example, from computer readable media such as memory 960 or other media on other computer systems. Such computer readable media may be permanently, removably or remotely coupled to a processing system such as system 900. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, media presentation system 200 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A media presentation system comprising:
  an amplifier, coupled to one or more speakers located in a media presentation area, and configured to generate an audio portion of a media presentation in the media presentation area;
  an audio analysis processor, coupled to one or more audio capture devices located in the media presentation area, and configured to analyze audio sample data of the generated audio portion;
  an audience analysis processor, coupled to one or more video capture devices in the media presentation area, and configured to
    capture a facial expression of an audience member, and
    analyze the facial expression for reaction to the generated audio portion; and
  an audio parameter processor, coupled to the amplifier, the audio analysis processor, and the audience analysis processor, and configured to instruct the amplifier to adjust one or more parameters associated with the audio portion of the media presentation in response to information associated with the audio analysis received from the audio analysis processor and the audience analysis received from the audience analysis processor;
  wherein the audience analysis processor further comprises:
    an image signal processor, coupled to the one or more video capture devices, and configured to convert image data captured by the one or more video capture devices to formatted image data;
    a face detection processor, coupled to the image signal processor, and configured to determine a portion of the formatted image data that is associated with a face of the audience member;
    a facial expression interpreter, coupled to the face detection processor, and configured to characterize a facial expression of the face of the audience member; and
    a facial expression scoring module, coupled to the facial expression interpreter, and configured to generate a score associated with the characterized facial expression wherein the score reflects the reaction of the audience member to the generated audio portion
  wherein the facial expression interpreter comprises:
    one or more machine learning processors configured to determine a facial expression from the portion of the formatted image data associated with the face of the audience member, and characterize the facial expression by associating the facial expression with a known reaction to perceiving an audio presentation;
    a facial expression filter, coupled to the face detection processor and the facial expression interpreter, and configured to exclude the facial expression from the facial expression interpreter if the facial expression is not associated with the generated audio portion.

2. The media presentation system of claim 1 wherein the facial expression interpreter further comprises one or more data sets comprising characterized facial expressions.

3. The media presentation system of claim 1 wherein the facial expression interpreter comprises circuitry configured to determine a facial expression from the portion of the formatted image data associated with the face of the audience member.

4. The media presentation system of claim 1 wherein the audience analysis processor further comprises:
  a body detection processor, coupled to the image signal processor, and configured to determine a portion of the formatted image that is associated with a body of the audience member; and
  a body expression interpreter, coupled to the body detection processor, and configured to characterize a body expression of the body of the audience member, wherein the facial expression scoring module is further configured to generate the score in association with the characterized body expression.

5. The media presentation system of claim 1 wherein the one or more video capture devices comprise an electronic imaging device comprising one of a charge-coupled device or an active-pixel sensor.

6. The media presentation system of claim 5 wherein the one or more video capture devices comprise a digital camera.

7. A media presentation system comprising:
  an amplifier, coupled to one or more speakers located in a media presentation area, and configured to generate an audio portion of a media presentation in the media presentation area;
  an audio analysis processor, coupled to one or more audio capture devices located in the media presentation area, and configured to analyze audio sample data of the generated audio portion;
  an audience analysis processor, coupled to one or more video capture devices in the media presentation area, and configured to capture a facial expression of an audience member, and analyze the facial expression for reaction to the generated audio portion; and
  an audio parameter processor, coupled to the amplifier, the audio analysis processor, and the audience analysis processor, and configured to instruct the amplifier to adjust one or more parameters associated with the audio portion of the media presentation in response to information associated with the audio analysis received from the audio analysis processor and the audience analysis received from the audience analysis processor;
wherein the audio analysis processor comprises:
audio capture circuitry, coupled to the one or more audio capture devices, and configured to generate audio sample data of the generated audio portion from the one or more audio capture devices; and
audio sample analyzer circuitry, coupled to the audio capture circuitry, and configured to compare the audio sample data with an equal-loudness contour model.

8. The media presentation system of claim 7 wherein the audience analysis processor further comprises:
an image signal processor, coupled to the one or more video capture devices, and configured to convert image data captured by the one or more video capture devices to formatted image data;
a face detection processor, coupled to the image signal processor, and configured to determine a portion of the formatted image data that is associated with a face of the audience member;
a facial expression interpreter, coupled to the face detection processor, and configured to characterize a facial expression of the face of the audience member; and
a facial expression scoring module, coupled to the facial expression interpreter, and configured to generate a score associated with the characterized facial expression wherein the score reflects the reaction of the audience member to the generated audio portion.

9. The media presentation system of claim 7 wherein the audio sample analyzer circuitry comprises fast Fourier transform circuitry to convert the audio sample to a spectral band.

10. The media presentation system of claim 7 wherein the audio sample analyzer circuitry comprises:
a decibel spectral level analyzer configured to compare the audio sample against the equal-loudness contour model to determine whether there are amplitudes of frequency ranges associated with the audio sample that do not conform to corresponding values of the equal-loudness contour model.

11. The media presentation system of claim 10 wherein the equal-loudness contour is selected from a set of equal-loudness contours in response to a present loudness level of the generated audio portion.

12. The media presentation system of claim 10 wherein the equal-loudness contour comprises a Fletcher-Munson curve.

13. An application processor comprising:
one or more general purpose processors;
audio sampling circuitry, coupled to the one or more processors and one or more audio capture devices, and configured to
generate audio sample data of a generated audio portion of a media presentation from the one or more audio capture devices, wherein the one or more audio capture devices are located in a media presentation area and receive the generated audio portion of the media presentation;
one or more image signal processors, coupled to the one or more processors and one or more video capture devices, and configured to
convert image data captured by the one or more video capture devices to formatted image data, wherein the one or more video capture devices are located in the media presentation area and are configured to capture images of an audience member in the media presentation area;
one or more machine learning accelerators, coupled to the one or more general purpose processors; and
a memory coupled to the one or more general purpose processors and the one or more machine learning accelerators, wherein the memory stores instructions executable by one or more of the one or more general purpose processors and the one or more machine learning accelerators, the instructions configured to
determine, by the general purpose processor, a portion of the formatted image data that is associated with a face of the audience member,
characterize, by the machine learning accelerator, a facial expression of the face of the audience member, and
generate, by the general purpose processor, a score associated with the characterized facial expression wherein the score reflects a reaction of the audience member to the generated audio portion;
compare the audio sample data with an equal-loudness contour model to determine whether there are amplitudes of frequency ranges associated with the audio sample data that do not conform to corresponding values of the equal-loudness contour model; and
adjust one or more of volume and equalizer values of the generated audio portion of the media presentation in response to the comparison of the audio sample data and the score associated with the characterized facial expression, wherein the score determines an adjustment portion of the difference between the audio sample data and the equal-loudness contour model.

* * * * *